(12) United States Patent
Spence et al.

(10) Patent No.: US 9,676,501 B1
(45) Date of Patent: Jun. 13, 2017

(54) SPACE SOLAR ARRAY ARCHITECTURE FOR ULTRA-HIGH POWER APPLICATIONS

(71) Applicant: Deployable Space Systems, Goleta, CA (US)

(72) Inventors: Brian R Spence, Solvang, CA (US); Stephen F White, Ventura, CA (US); Peter Sorensen, Santa Barbara, CA (US)

(73) Assignee: Deployable Space Systems, Goleta, CA (US)

( * ) Notice: Subject to any disclaimer, the term of this patent is extended or adjusted under 35 U.S.C. 154(b) by 0 days.

(21) Appl. No.: 14/841,631

(22) Filed: Aug. 31, 2015

Related U.S. Application Data

(62) Division of application No. 13/447,166, filed on Apr. 14, 2012, now Pat. No. 9,120,583.

(51) Int. Cl.
*B64G 1/22* (2006.01)
*B64G 1/44* (2006.01)
*H02S 30/20* (2014.01)

(52) U.S. Cl.
CPC ............. *B64G 1/443* (2013.01); *B64G 1/222* (2013.01); *H02S 30/20* (2014.12)

(58) Field of Classification Search
CPC ........... B64G 1/222; B64G 1/443; B64G 1/44
USPC ......... 244/159.5, 172.6, 172.7, 172.8, 172.9; 136/245, 292
See application file for complete search history.

(56) References Cited

U.S. PATENT DOCUMENTS

| | | | | |
|---|---|---|---|---|
| 4,727,932 A * | 3/1988 | Mahefkey | ............... | B64G 1/50 165/104.26 |
| 5,344,497 A * | 9/1994 | Fraas | ...................... | F24J 2/085 136/246 |
| 5,487,791 A * | 1/1996 | Everman | ............... | B64G 1/222 136/245 |
| 5,496,414 A * | 3/1996 | Harvey | .................... | F24J 2/085 136/245 |
| 5,505,789 A * | 4/1996 | Fraas | ...................... | F24J 2/085 136/246 |
| 5,578,139 A * | 11/1996 | Jones | ...................... | B64G 1/44 136/245 |

(Continued)

*Primary Examiner* — Philip J Bonzell
*Assistant Examiner* — Michael Kreiner
(74) *Attorney, Agent, or Firm* — R. Scott Kimsey, Esq.; Klein DeNatale Goldner

(57) ABSTRACT

A large area, deployable flexible blanket photovoltaic solar array architecture for high power applications is disclosed. The structure is a modularized and scalable solar array system that provides high power level scalability. The structure is comprised of repeating, similar modular deployable roll-out solar array wings mounted in an opposing manner and along the length of a rigid, strong and efficiently packaged deployable backbone structure. The deployable roll-out solar array building block modular "winglet" elements can be comprised of either a rolled or z-folded flexible photovoltaic blanket configuration, and their structural deployment is motivated by the elastic strain energy of longitudinal roll-out booms. The backbone structure is comprised of a stiff deployable beam structure articulated that is deployed perpendicular with respect to the spacecraft sidewall and latched out. Deployment of the "winglets" can be conducted once the articulated backbone structure has been deployed, is latched, and forms a rigid beam.

3 Claims, 12 Drawing Sheets

(56) References Cited

U.S. PATENT DOCUMENTS

| | | | | |
|---|---|---|---|---|
| 6,075,200 A * | 6/2000 | O'Neill | ................. | B64G 1/222 |
| | | | | 126/698 |
| 6,437,232 B1 * | 8/2002 | Dailey | ................. | B64G 1/222 |
| | | | | 136/245 |
| 6,637,702 B1 * | 10/2003 | McCandless | ......... | B64G 1/222 |
| | | | | 244/172.6 |
| 6,983,914 B2 * | 1/2006 | Stribling | ............... | B64G 1/222 |
| | | | | 136/292 |
| 7,806,370 B2 * | 10/2010 | Beidleman | ............ | B64G 1/222 |
| | | | | 136/245 |
| 8,894,017 B1 * | 11/2014 | Baghdasarian | ....... | B64G 1/443 |
| | | | | 136/245 |
| 9,346,566 B2 * | 5/2016 | Spence | ................ | B64G 1/222 |

\* cited by examiner

SPACE SOLAR ARRAY ARCHITECTURE FOR ULTRA-HIGH POWER APPLICATIONS

RELATED APPLICATIONS

This application claims priority to U.S. patent application Ser. No. 13/447,166, filed Apr. 14, 2012 and entitled "Space Solar Array Architecture for Ultra-High Power Applications," which in turn claims priority of U.S. patent application Ser. No. 13/410,279, filed Mar. 1, 2012. Both of the aforementioned applications are incorporated herein by reference in their entirety.

FIELD OF THE INVENTION

This invention relates to space solar arrays for spacecraft, and more particularly to highly compact stowage and very-large deployed area architecture deployable flexible blanket solar arrays for extremely high power applications.

BACKGROUND

A solar array, as defined herein, pertains to a structure which is stowable in a small volume for shipment and launch, and that is deployable when in space to expose a large surface area of photovoltaic collectors (solar cells) to the sun, and that is attached to certain spacecraft vehicles, to provide power for spacecraft operations. Solar arrays typically consist of an underlying structure for deployment of a substantial number of individual photovoltaic solar cells from the body of a spacecraft. Once fully deployed, it is desirable for the solar array structure to provide a light-weight, stiff, strong, stable and flat platform for the solar cells to allow uniform exposure to the sun and minimize on-orbit spacecraft attitude control disturbance loads. Solar arrays are typically stowed such that they are constrained in a small envelope prior to and during launch of the spacecraft and then are deployed to their fully extended configuration, exposing the maximum area of solar cells once the spacecraft has reached its position in outer space. It is desirable to minimize the volume of the stowed package while at the same time maximizing the available solar cell area that can be packaged when stowed, and subsequently deployed to allow for maximum power production for the spacecraft.

In certain spacecraft and other space-based solar power applications, an extremely large area of photovoltaics needs to be deployed to provide very high levels of power. While the largest solar arrays deployed from a typical large communication satellite provide 15 to 25 kilowatts (kW) at beginning of life, an very-high power solar array may be required to provide from 100 kW to greater than 1000 kW (1 megawatt) of power. An example of missions requiring such large solar array power are solar electric propulsion (SEP) missions that utilize high power levels to run an ion-thruster engine for space propulsion.

FIG. 1 shows a typical spacecraft (101) that uses a high-power solar array (102) for power production, with the high-power solar array (102) in the deployed configuration.

As the deployed size of solar arrays is scaled up to a degree required for ultra-high power applications, the need to package very efficiently from the deployed state into a sufficiently small stowed volume becomes critical and enabling to allow the significant solar cell area to be launched into space. This is because the limiting constraint is the available size launch vehicle fairing volume that carries the stowed high-power solar array, spacecraft bus and all associated mission hardware in a single earth-to-space launch. FIG. 2 shows a typical spacecraft (101) that utilizes a high-power solar array (102) in the configuration where it is stowed (packaged for launch, 201) and within a typical launch vehicle shroud (202), showing the stowed volume within the shroud available for the stowed high-power solar array (2.03).

In many prior art applications of solar arrays, the structure consists of flat rigid panel substrates that are configured for stowage by means such as hinges which will permit the panels to be folded against each other to minimize the dimensions of the array in the stowed configuration. The stowed packaging efficiency (defined as the ability to fill up or utilize the available volume for the stowed solar array inside the launch vehicle volume) of the typical folded-up rigid panel solar arrays becomes poor as the array is scaled up to high-power levels. The stowed packaging of a very large high-power rigid panel solar array involves the use of many more moving mechanical items such as hinges and latches; and actuating mechanisms such as springs, cables and pulleys. The much greater number of mechanical components required for a high-power rigid panel application reduces deployment reliability, and increases system weight and cost. The rigid panels themselves add significant undesirable weight when scaled up to very large sizes or when their numbers increase to meet deployed area requirements.

Other key considerations when scaling up solar arrays to very high power levels is the minimization of weight, and the maximization of deployed stiffness and strength. Because of its much larger size, the proportion of launch mass of a high-power solar array is much higher portion of the overall spacecraft mass, limiting options for launch vehicles to those capable of carrying sufficient mass to orbit. A lower mass, smaller packaged alternative to the state-of-the-art solar arrays allows a larger selection of available launch vehicles to be utilized for very high-power missions. It is also desirable to maximize the deployed natural frequency (stiffness) and strength (against deployed accelerations) of a solar array. Low mass and high stiffness/strength when deployed results in sufficiently low deployed mass moments of inertia and high deployed frequencies which enable standard "passive" methods of spacecraft attitude control systems and more accurate sun-pointing of the large-area structures to be implemented. As the size of the solar cell deployed area and the solar array supporting structure increase, the stiffness of the solar cell array decreases and, as a result, the vibration frequency decreases and disturbance deflections increase. The ability of the spacecraft attitude control system to orient the spacecraft may be impaired if the deflections due to low-frequency solar array movement are excessive.

In order to allow for the added reduction in a deployable solar arrays weight and stowed volume required for very high power applications, the solar cell mounting can be configured using a flexible substrate, or blanket. Various flexible solar cell blanket substrates have been used, such as those fabricated from a fiberglass mesh or thin polymeric sheet upon which are bonded the numerous crystalline solar cells. Flexible-blanket solar arrays for use on spacecraft have typically been limited to crystalline solar cell arrays packaged in a long roll or pleated stack that is deployed using a separate deployment boom or hub structure requiring external motor power for deployment motive force. These flexible array deployment structures have consisted of very complex mechanical systems such as coilable or articulated truss booms, or radially oriented spars that rotate about a central hub, which can add undesired parts, complexity, weight and cost to implement. Examples of prior art flexible blanket arrays are shown in the following U.S. patents: Harvey et al U.S. Pat. No. 5,296,044; Stribling et al U.S. Pat. No. 6,983,914; and Hanak et al U.S. Pat. No. 4,636,579.

Because of the extreme size (and corresponding weight) required of a typical very high power solar array, both during deployment and when fully deployed, the ability to verify the solar array mechanical and electrical function on earth, under one earth gravity (1-G) through functional testing becomes a primary consideration. The system required for 1-G off-loading support of the high-power solar array to simulate zero-gravity during deployment for all critical elements of the huge array structure can rival the array itself in complexity and cost, and in some cases it is physically impossible to off-load/support such a large, gossamer structure during deployment under 1-G to adequately simulate a deployment in space. Additionally the photovoltaic elements and electrical performance of the large solar cell-populated area needs to be validated and verified throughout the ground test and integration phases prior to launch. A key consideration in the viability of any high solar array power design is the ability to test-validate its performance on the ground.

A review of the prior art of large solar arrays shows that significant efforts have been made to reduce the weight and increase the deployment reliability of rigid panel and flexible blanket-type solar arrays for a given set of deployed stiffness and strength requirements. Although these prior large solar array design solutions have resulted in solar arrays tending to involve difficult and time consuming manufacturing, higher complexity and higher cost, most of these prior applications were designed for power applications below 30 kW. Most of the prior-art solutions therefore do not scale-up to the degree needed for very high power (>100 kW) and do not adequately address the design considerations/requirements required for scale of very high power solar arrays, such as extremely high stowed packaging efficiency, minimization of mechanical/deployment complexity, high deployed stiffness and strength, and ability to be functionally validated/tested on earth under 1-G. Under funding through the DARPA FAST program, and as presented during the 2009 and 2010 Space Power Workshop Conference, the Boeing Company has been developing a solar array called HPSA (High Power Solar Array) for ultra-high power application. The Boeing Company has designed HPSA for accommodation of a lightweight ultra-thin IMM photovoltaic flexible blanket assembly (under the AFRL's IBIS program), and of a venation-blind type reflective concentrator blanket assembly (under the FAST program). Boeing's HPSA solar array is not similar to the proposed Mega-ROSA embodiment. The HPSA design is very complex, has many mechanisms and cables, and requires multiple motors and heavy mechanisms for deployment of both the support structure and wing structures. Unlike the proposed embodiment, the deployable backbone structure for the Boeing HPSA technology is comprised of many non-orthogonal rotatable structural elements with discrete motorized joints and latches. The entire backbone structure is a motor driven deployment that deploys in an unusually non-orthographic kinematic matter. This complex backbone structure used on the Boeing HPSA technology is very different that the deployable backbone approached suggested by the Mega-ROSA embodiments (such as an accordion folded or telescopic boom backbone structure architectures as presented in the ensuing section).

The only other extremely large area solar arrays were for the International Space Station which were developed and build by Lockheed Martin. Unlike the proposed Mega-ROSA embodiment, the Space Station solar arrays consist of multiple solar array wings, comprised of a central deployable articulated open-lattice boom structure and side photovoltaic blanket assemblies spanning each side of the boom. These deployment solar array wings were then mounted to a non-deployable space-frame rigid truss structure that occupies a very large stowage volume and is not required to be compacted further for stowage like the proposed Mega-ROSA design. The significance of the Space Station solar arrays are that it deployed very large photovoltaic areas to provide high power level and only that.

As the demand for spacecraft power grows to very high power levels (>100 kW), it is desirable to provide a deployable solar array system that permits straightforward scaling up in size to allow the use of larger deployed solar cell areas. It is also desirable to enhance reliability, while at the same time reducing weight and cost, by reducing the number of different component parts and mechanisms required to achieve deployment and adequate deployed performance. Because mechanical components are subject to failure, and must be rigorously tested as an assembled system to validate their reliability; solar array reliability can be increased significantly, while simultaneously reducing cost and mass, by reducing the amount of mechanical components and mechanisms required to deploy and form the array into a deployed structure. A modular approach, where smaller, simpler, manufacturable and testable, building block elements are combined in a straightforward packaging arrangement to form a much larger, yet inherently simple deployable architecture is ideal to meet the very high-power design requirements, and allow the design to remain practical and viable for actual implementation.

The very high power solar array of this invention has been greatly simplified relative to the state of the art by significantly reducing the complexity and number of mechanical parts, and different unique components required for deployment of the extremely large solar cell-populated areas. The invention utilizes the modular building block elements of multiple, similar and simple roll-out solar array deployable solar array "winglet" modules mounted in a repeating fashion onto a central deployable rigid "backbone" structure platform that provides the primary deployed structural stiffness and strength and allows attachment of the solar array to the spacecraft, and stows efficiently into an compact package for launch. A unique aspect of the invention's platform design is its high degree of modularity, scalability and configuration (stowed and deployed form) flexibility.

The roll-out solar array "winglet" module portion of the invention replaces many complex deployable mechanisms required for the unfurling deployment of a typical flex-blanket solar array structure, with a simple ultra-lightweight one-part tubular rolled boom structural element that reliably elastically self-deploys under its own strain energy and is directionally controlled such that it deploys in a known, unidirectional manner without the need for heavy and complex auxiliary actuators to assist deployment or add deploy force. The boom structural element requires no hinges, dampers, complicated synchronization mechanisms, brakes, or motors for deployment, and does not have the parasitic mass associated with the mechanisms typically required by other prior art deployable solar array structures to achieve high deployment force margin. Because the winglet boom structure self-deploys elastically via its own high internal strain energy, it does not require passive (solar) or active (via powered heaters) heating of the boom material to actuate deployment, and provides its own internally-generated high deployment force. The available strain energy for conducting deployment can be maximized to achieve the desired deployment force margin by the use of a highly unidirectional thin fiber-composite layup material for the roll-out boom, because the boom component of this invention is directionally controlled to always unroll in a known and predictable direction, without requiring a special (lower deployment force) bi-stable elastic laminate or elastic memory composite (EMC) material.

The winglet module portion of the invention also enables uniform stowage and secure packaging of the fragile solar cell-populated flexible blanket by maintaining a decoupled arrangement between the blanket longitudinal edges and the deployment structural elements, allowing either a rolled flexible photovoltaic blanket, or an accordion Z-folded flat-package arrangement to be implemented when stowed; and allowing either simultaneous or independent deployment of the boom structure and flexible blanket.

The deployable backbone structure module portion of the invention, provides the mounting interface support and deployment structure for the roll-out winglets; and when fully deployed and latched develops the primary central stiffness and strength for the large very high power solar array wing. In addition to providing the primary structural element, the backbone is capable of packaging extremely efficiently when stowed to enable the spacecraft/launch vehicle integration of such huge power levels. The backbone structure deploys in a controlled, repeatable and synchronized manner, and employs either an articulated or telescopic-type boom configuration; both methods can utilize multiple synchronization/deployment actuation methods (such as spring driven, motorized and cable-pulley).

In more concise terms, a deployable backbone structure for support of one or more pairs of roll-out-solar array winglets is claimed. It comprises a stowage surface from which the backbone structure is deployed. The backbone structure also comprises a deployment boom operable for compact stowage, for extension from the stowage surface via a deployment actuation system, and for providing a stable, secure platform for deployment of one or more pairs of roll-out-solar array winglets. It further comprises a latching system operable for stiffening and stabilizing the deployment boom in its extended position and one or more roll-out-solar array winglets.

The deployable boom may comprise a compactable lattice truss operable for containment within a canister for stowage, for linear extrusion from the containment canister upon extension, and for forming a rigid extended boom upon deployment.

The deployment boom may alternately be comprised of linearly connected backbone beam elements connected via a Z-fold configuration. Each of the hinged beam elements may have a length, first end and a second end. The first end of one of the hinged beam elements may be hingeably connected to the second end of another of the hinged beam elements, thereby forming a hingeably connected linear array of hinged beam elements. Each of the hinged beam elements may also have a synchronized z-fold actuation system operable for effecting the transition between the stowed configuration wherein the hinged beam elements are tightly packed such that their lengths are in immediate proximity to each other, and the deployed configuration wherein the hinged beam elements are rigidly aligned end to end. The hinged beam elements may further comprise a set of planar rectangles operable for stacked arrangement while in the stowed configuration, and rigidly aligned end-to-end in the deployed configuration. Or, the hinged beam elements may further comprise a Z-folded set of nestable deep open section beams, operable for compact nestable arrangement while in the stowed configuration, and for having rigid connection and end-to-end alignment in the deployed configuration.

Alternatively, the backbone beam elements may be telescopically configured with a plurality of telescopic beam elements having a length, first end and a second end. Upon deployment, the first end of one of the each of the telescopic beam elements may be connected to the second end of another of the each of the telescopic beam elements. Each of the telescopic beam elements may also have one or more intermediary structures situated therebetween, operable for sequential extrusion of each of the telescopic beam elements in turn, thereby forming a deployment platform for deployment of the roll-out-solar array winglets. The telescopic beam elements may also have a synchronized telescoping actuation system operable for effecting the transition between the stowed configuration wherein the beam elements are tightly packed such that their lengths are concentric, and the deployed configuration wherein the beam elements are rigidly connected together and aligned end-to end. The telescopic beam elements may further comprise a set of telescopically nestable closed section tubes operable for telescopically nestable arrangement while in the stowed configuration, and for having rigid connection and end-to-end alignment in the deployed configuration.

Other desirable features and characteristics of the present invention will become apparent from the subsequent detailed description of the invention and the appended claims, taken in conjunction with the accompanying drawings and this background of the invention.

DESCRIPTION

Description of the Items in the Figures

101—Spacecraft: The primary structure to which the very high power solar array(s) are mounted to and provide power for; that carries payloads and is launched into space.

102—Very high power solar array: A solar array that is of a size class larger than 50 kW and is scalable to achieve deployed areas capable of producing over 500 kW; and includes a deployable backbone structure (103), and one or more deployable Roll-Out Solar Array (ROSA) winglets (104). Deployed solar array wing: A structure which is stowable in a small volume for shipment and launch, and that is deployable when in space to expose a large surface area of photovoltaic collectors (solar cells) to the sun, and that is attached to certain spacecraft vehicles, to provide power for spacecraft operations.

103—Deployable backbone structure: A central structural element of the very high power solar array wing that provides the mounting interface support and deployment structure for the roll-out solar array winglets (104), and when fully deployed and latched develops the primary central stiffness and strength for the large very high power solar array wing. To allow the very high power solar array system to be stowed for launch and then deploy once in space, the deployable backbone structure is of a segmented construction consisting of two or more backbone beam segments (105) that are interconnected and latched together when deployed.

104—Roll-Out Solar Array (ROSA) winglets: A modular deployable solar array sub-element of the very high power solar array system (102) consisting of one or more longitudinally-oriented thin-walled elastic roll out booms (301); one lateral mandrel assembly (302); one or more lateral blanket attachment support structures (303), one base support structure (304); and one or more planar flexible photovoltaic (PV) blankets (305).

105—Backbone beam segments: The linear beam elements of which the segmented backbone structure is comprised, and interconnected at their ends, and latched together when deployed; and which provide the base mounting interface support for the ROSA winglets (104).

201—Very high power solar array, stowed configuration: A configuration of the very high power solar array (102), whereby the deployable backbone structure (103) and the ROSA winglets (104) are folded and efficiently packaged into a small state to allow integration onto the spacecraft so that it fits acceptable into the limited available volume (203) within the launch vehicle shroud (202).

202—Launch vehicle shroud: The tip portion of the launch vehicle within which the spacecraft is mounted for launch and must be packaged within to be protected during launch vehicle ascent.

203—Stowage volume available for stowed high-power solar array: The volume within the launch vehicle shroud (202) within which the very high power solar array in the stowed configuration (201) must fit when attached to the spacecraft (101) in order to be launched into space.

204—Backbone structure launch hold-downs: Releasable actuators that allow rigid attachment of the stowed backbone structure (201) to the spacecraft (101) body during launch, and when actuated allow the initiation of the deployment phase of the deployable backbone structure (103) assembly.

301—Elastic roll out booms: A roll out boom that that is constructed such that it is self-deploying elastically though its own internal strain energy; and remains in the elastic state when rolled up. The elastic roll out boom does not require passive heating or active heating on the structural tubular member to actuate deployment, and provides its own sufficiently high deployment force. The elastic boom component is directionally controlled to always unroll in a known and predictable direction using one or more methods of deployment control.

302—Lateral mandrel assembly: Component of the ROSA winglet (104) that is a hollow lightweight tube onto which the elastic roll out booms (301) and/or the planar flexible PV blanket (305) is rolled onto for compact stowage.

303—Lateral blanket attachment support structure: Component of the ROSA winglet (104) that is a structure attached to each of the lateral mandrel assemblies (302) that spans between them and is located at the tip of the array structure when deployed and to which the flexible PV blanket assembly (305) may be attached.

304—Base support structure: Component of the ROSA winglet (104) that is the lateral base structural support onto which the longitudinal elastic roll-out booms (301) and flexible PV blanket (305) are attached; and provides a mounting location for the ROSA winglet assembly to attach to the deployable backbone structure (103) backbone beam segments (105).

305—Flexible photovoltaic (PV) blankets: A thin flexible substrate that has mounted to it an array of photovoltaic solar cells and associated wiring that can be rolled or folded into a small package for stowage; and is attached to the deployable solar array structure for unfurling into a flat, tensioned configuration during deployment.

401—Articulated backbone hinges: Mechanical components of the articulated embodiment of the deployable backbone structure (103) that allow the backbone beam segments (105) ends to rotate relative to one another about the hinge line axis (402) to allow for stowed packaging in a Z-accordion fashion.

402—Backbone hinge line axes: The rotational axes defined by the articulated backbone hinges (401) of two adjacent articulating backbone beam segments (105) that allow the beam segments (105) ends to rotate relative to one another to allow for folding for stowed packaging and subsequent unfolding deployment in a Z-accordion fashion.

403—Backbone synchronization pulleys: Round pulleys (403) located at each backbone hinge line (402), and that constrain and control fixed cables that run longitudinally along each backbone beam segment (105) and are actuated by a motor or spring assembly located at the base of the deployable backbone structure (104) to provide known positioning and synchronization of the backbone structure elements during deployment of the articulated embodiment of the deployable backbone structure (103).

404—Articulated backbone latch assemblies: Mechanisms located at each backbone hinge line (402) to allow the backbone beam segments (105) to interconnect and lock rigidly together in a preloaded fashion when the Z-unfolded backbone structure is fully extended to develop maximum full-deployment stiffness and strength from the deployed articulating backbone structure (104). The articulated latch assemblies may consist of one or more spring-loaded rotating wedges or spring loaded tapered pins that oppose the hinge line axis (402), and engage a mating surface or hole initially when one or more interconnected beam segment hinges (401) is close to fully extended; and continue to engage the mating surface or hole further and tighten as the hinges (401) continue to reach full geometric extension as defined by one or more hinge hard-stops (405).

405—Hinge hard stops: Mechanical features located at each articulated backbone hinge (401) that make contact when the backbone structure beam segments (105) reach full geometric extension and provide preload to the backbone hinge (401) joint to allow maximum stiffness and strength to be developed by the deployed articulated backbone structure (103).

601—Backbone structure beam segments comprised of flat solid panel or picture-frame construction: An embodiment of the backbone structure beam elements (105) whereby the beam segments are comprised of solid or honeycomb flat or reinforced panel construction; or form a flat perimeter picture-frame arrangement.

602—Fully stowed configuration of flat solid panel or picture frame construction: The configuration when stowed of the flat solid panel or picture-frame backbone embodiment whereby the backbone structure beam segments (105) stack on top of each other when fully stowed.

701—Z-unfolding deployable backbone structure beam segments comprised of an angular "U" or "V" shaped open cross section construction: Backbone beam segment construction that allows for efficient stowed packaging because adjacent members fit (nest) together in a larger-to-smaller fashion; and that also allows for significant depth of the beam section about the primary bending axis of the backbone structure when deployed (702).

702—Depth of section about primary bending axis of the backbone structure when deployed: The dimension of the deployed backbone structure beam segments (105) that, because its "U" or "V" shaped open cross section construction (701) allows it, can be increased to a larger dimension to provide maximum cross-sectional moment of inertia about the backbone beam bending axis and correspondingly maximize bending stiffness and strength for the deployed backbone structure (103).

703—Nesting Z-unfolding during deployment: The configuration whereby, because of their cross-section shape and construction, the backbone structure beam segments (105) package efficiently when stowed and subsequently facilitate separation during Z-unfolding deployment because adjacent members fit (nest) together in a larger-to-smaller fashion.

704—Stowed configuration of Z-unfolding deployable backbone structure: The configuration whereby, because of their cross-section shape and construction, the backbone structure beam segments (601) are allowed to package efficiently to minimize volume when stowed against the spacecraft (101), because adjacent members fit (nest) together in a larger-to-smaller fashion.

801—Telescoping deployable backbone structure tubular beam elements: The backbone beam segments (105) of the telescoping backbone structure embodiment, which are each comprised of a tubular closed section; and the closed section tubular beam elements are progressively smaller in cross-section size to allow them to nest radially within one another when stowed for efficient packaging.

802—Outermost-when-deployed (smallest diameter or size) closed section tubular beam element: The telescoping deployable backbone structure tubular beam element (801) that is extended first and upon full extension of its longitudinal length from the nested tube stack, its adjoining end is latched to the next sequential closed section tubular beam element (803) tip with tubular backbone element latch assemblies (804) that are located at the backbone tube element's (801) end.

803—Next sequential closed section tubular beam element: The telescoping deployable backbone structure tubular beam element that is adjacent to the outermost-when-deployed (smallest diameter or size) closed section tubular beam element (802); and latches to it at its end upon its full extension.

804—Tubular backbone element latch assemblies: Mechanical latch assemblies that are located at each backbone tube element (801) end. The latching allows the backbone tubular segments (801) to interconnect and lock rigidly together sequentially as each closed section tubular beam element (801) is fully extended; at a location at the adjacent tube full-extended interface, in a preloaded fashion to develop maximum full-deployment stiffness and strength from the deployed tubular-telescopic backbone structure (104).

805—Articulating winglet support struts: Struts that are configured in pairs; and to which the roll out solar array winglets (104) are mounted to; and are connected together at a first end with winglet support strut hinge assemblies (807) that allow rotation of the articulating winglet support struts; and at their second end are attached to the telescoping deployable backbone structure tubular beam elements (801) via hinged lateral support braces (808) that laterally span between the outermost extending end of each telescoping tubular backbone structure element (801) and each articulating winglet support strut (805) second end.

806—Outermost tip articulating winglet support struts: The set of articulating support struts that are located at the outermost (tip) end of the deployable telescopic tubular backbone structure, and are attached to the outermost (tip) telescoping deployable backbone structure tubular beam element (801) via a hinged tip lateral support brace (810) and a hinged tip articulation link; and are the first pair to deploy upon initiation of the tubular extension of the deployable backbone structure (103); and to which the outermost roll-out solar array winglets are attached.

807—Winglet support strut hinge assemblies: Hinges located at the ends of the articulating winglet support struts (805) that allow relative rotation between strut ends to allow the kinematic motion of the articulating winglet support struts (805).

808—Hinged lateral support braces: Structural elements that are normal to the deployment extension direction, and laterally span between the outermost extending end of each telescoping tubular backbone structure element (801) and each articulating winglet support strut (805) second end.

809—Tubular telescopic backbone stowed configuration: the configuration when stowed and packaged for launch whereby the progressively smaller in size telescoping deployable backbone structure tubular beam elements (801) nest radially within one another to enhance packaging efficiency and facilitate sequential axial deployment.

810—Tip lateral support brace: The hinged lateral support brace (see 808) that is located at the outermost (tip) end of the deployable telescopic tubular backbone structure, and are attached to the outermost (tip) telescoping deployable backbone structure tubular beam element (801), and to the hinged tip articulation link (811).

811—Hinged tip articulation link: a longitudinal structural element that interfaces at a longitudinal location near the mid-span of the outermost tip articulating winglet support struts (806) at one end, and to the tip lateral support brace (810) at the other end; and is hinged at both end attachments to facilitate the articulated (rotational) deployment of the first set of outermost tip articulating winglet support struts (806) upon telescopic axial deployment of the outermost-when-deployed (smallest diameter or size) closed section tubular beam element (802).

812—Base attachment hinge of very high power solar array: A hinge joint that allows attachment of the very high power solar array to the spacecraft (101), and allows it to articulate 90 degrees from its stowed position against the spacecraft (101) to position it and provide clearance for the telescopic tubular backbone structure (801) deployment sequence.

1201—Extendible lattice mast deployable backbone structure: An embodiment of the deployable very high power solar array structural system that is similar in kinematic deployment function as the nested tubular-telescopic deployable backbone structure design; however the nested telescopic tubular structural elements are replaced with an extendible lattice mast deployable backbone structure (1201), consisting of a central deployable lattice truss mast (1202).

1202—Deployable lattice truss mast: the central axially-extruding deployment actuating structure for the extendible lattice mast deployable backbone structure embodiment (1201), that may be of the articulating/latching or continuous-coilable longeron type; and consisting of individual folding or coiled truss bay elements (1203) that allow the backbone mast structure to package compactly when stowed; and form rigid truss bays (1204) that are deployed in a linear-extruding manner from a cylindrical containment canister (1205).

1203—Individual folding or coiled truss bay elements: The deployable lattice truss mast individual structural elements that are hinged or coiled to allow the backbone mast structure to package compactly when stowed; that are deployed in a linear-extruding manner from a cylindrical containment canister (1205), and form rigid truss bays (1204) when fully deployed.

1204—Rigid truss bays: The structural element formed upon full extension/deployment of the individual folding or coiled truss bay elements (1203) that provide the deployed stiffness and strength for the Extendible lattice mast deployable backbone structure (1201).

1205—Cylindrical containment canister: The storage housing for the deployable lattice truss mast (1202) when it is in the stowed configuration; and from which it is deployed from in a linear-extruding manner; and may include a motorized gear-driven rotating nut or equivalent actuator that provides high deployment axial push force margins for the lattice truss mast or boom deployable structure (1202) extension.

DETAILED DESCRIPTION OF THE PREFERRED EMBODIMENTS

Figure 1:
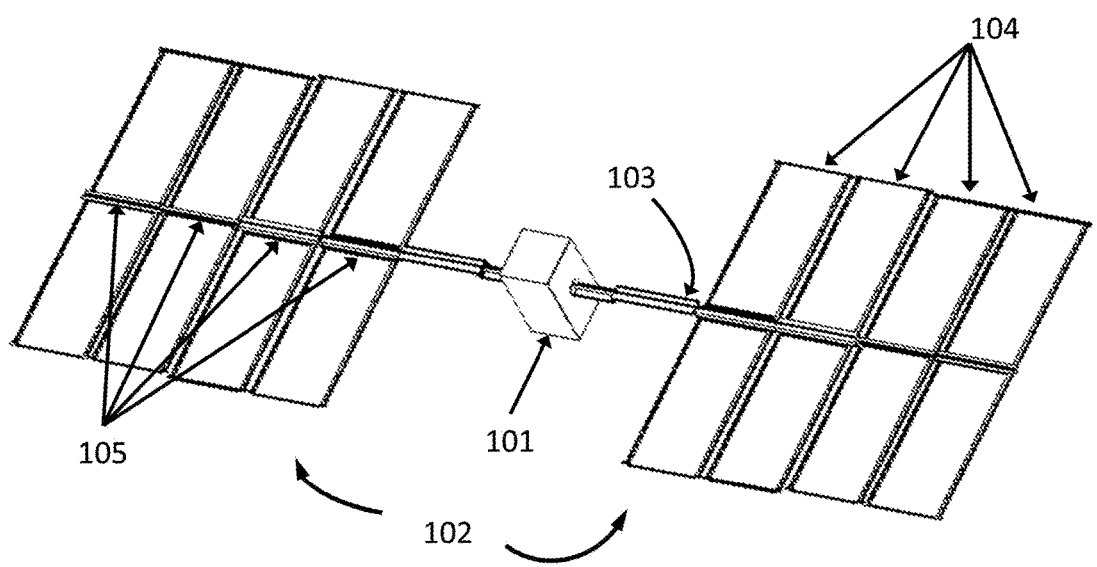
FIG. 1: is a perspective view of a typical spacecraft (101) that uses very high power solar arrays (102) for power production.

FIG. 1 shows a typical spacecraft (101) that uses very high power solar arrays (102) for power production, with the very high power solar arrays (102) shown in the deployed configuration. A very high power solar array (102) according to this invention, is a solar array that is of a size class larger than 50 kW and is scalable to achieve deployed areas capable of producing over 500 kW; and includes a deployable backbone structure (103), and one or more deployable Roll-Out Solar Array (ROSA) winglets (104). The deployable backbone structure (103) provides the mounting interface support and deployment structure for the roll-out solar array winglets (104); and when fully deployed and latched develops the primary central stiffness and strength for the large very high power solar array wing. To allow the very high power solar array system to be stowed for launch and then deploy once in space, the backbone structure is of a segmented construction consisting of two or more backbone beam segments (105) that are interconnected and latched together when deployed. Each backbone beam segment provides the base mounting interface support and deployment structure for the ROSA winglets (104) to deploy from and extend laterally from when deployed.

Figure 2:
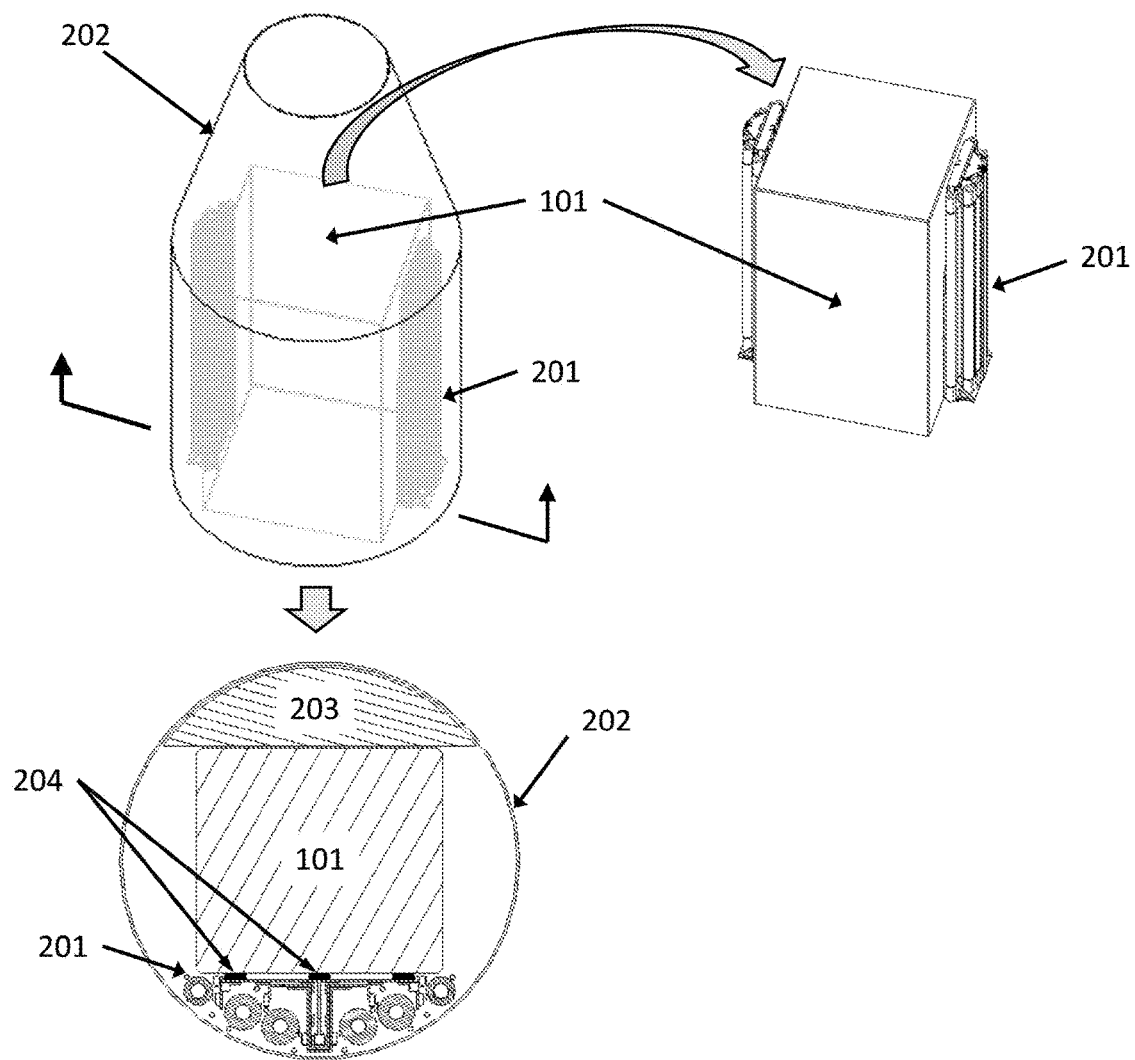
FIG. 2: is a perspective view of a typical spacecraft (101) that utilizes a high-power solar array in the configuration where it is stowed (201) and packaged for launch and within a typical launch vehicle shroud (202), showing the stowed volume within the shroud (203) available for the stowed high-power solar array (201)

In addition to providing the primary structural element, the backbone is capable of packaging extremely efficiently when stowed to enable the spacecraft/launch vehicle integration of the stowed very high power solar array (201) into the limited available volume within a typical launch vehicle shroud (202). FIG. 2 shows a typical spacecraft (101) that utilizes a high-power solar array in the configuration where it is stowed (201) and packaged for launch and within a typical launch vehicle shroud (202), showing the stowed volume within the shroud (203) available for the stowed high-power solar array (201). To allow efficient stowed packaging, the backbone structure is of a segmented construction and after the backbone is released from the spacecraft, the backbone beam segments (105) deploy in either a folding-articulated or telescopic-extruding fashion utilizing deployment actuators, mechanisms, synchronization methods and latches of various types (described in ensuing embodiment descriptions) that allow the backbone deployment motion to occur in a controlled, repeatable and synchronized manner. When fully deployed the backbone beam segments (105) latch together in a preloaded fashion to develop maximum stiffness and strength from the deployed backbone structure (103), upon which the roll-out solar array winglets and associated electrical harnessing are mounted. The backbone structure also provide a mounting/deployment structure for the associated electrical power harnessing that is required to run from the solar power-generating ROSA winglets (104) to the spacecraft (101).

Restraint of the deployable backbone structure (103) in the stowed configuration for launch may be achieved with backbone structure launch hold-downs (204) consisting of releasable actuators that allow rigid attachment of the stowed backbone structure (201) to the spacecraft (101) body during launch.

Figure 3:
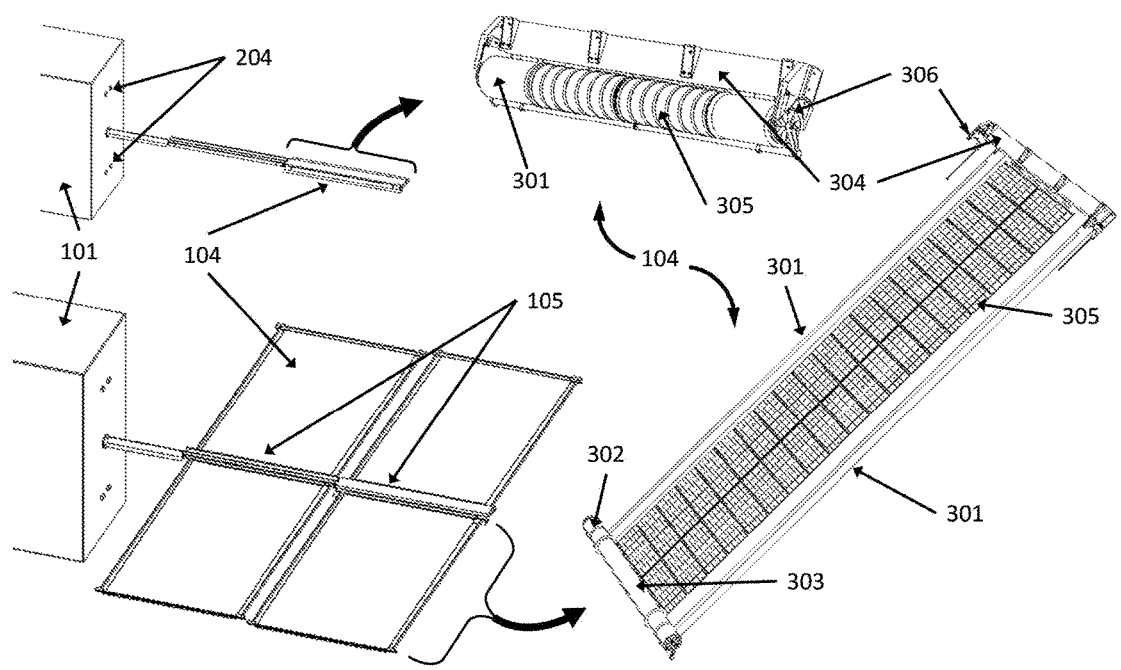
FIG. 3: is a perspective view of a very high power solar array wing (102) in various stages of deployment of the backbone structure (103) and in accordance with an exemplary embodiment of the present invention having a single backbone structure consisting of multiple backbone structure beam elements, two directionally controlled elastic roll out booms (201) and a single rolled flexible PV blanket (204) in the stowed packaged configuration.

The backbone structure provides the primary mounting structure and interfaces for the two or more ROSA winglets (104), which are mounted in adjacent pairs to one or more of the backbone beam segments (105), as shown in FIG. 3 in the stowed and deployed configurations, respectively. Depending on the size of the ROSA winglets and the power level required when deployed, and the allowable stowed packaging height within the launch vehicle shroud (205), the number of ROSA winglets can be varied, which allows for a modular scaling-up of the system power production capability by adding more modular ROSA winglets and extending the deployable backbone structure length. The two or more ROSA winglets (104) each consist of one or more longitudinally-oriented thin-walled elastic roll out booms (301); one lateral mandrel assembly (302); one or more lateral blanket attachment support structures (303), one base support structure (304); and one or more planar flexible photovoltaic (PV) blankets (305) attached to the lateral blanket tip support structures (303) and base support structure (304), and spanning between them under tension when fully deployed. The flexible photovoltaic blankets (305) may be packaged in a rolled or Z-folded configuration and remain uncoupled to the elastic roll out booms (301) along their longitudinal edges. The elastic roll out booms (301) may be comprised of closed sections or open sections that allow for rolled packaging.

Regardless of the specific backbone structure or winglet configuration, the deployment of the very high power solar array system (102) is performed in two primary stages, described in detail below for the specific preferred embodiment descriptions. In the first stage, the stowed very high power solar array (102, see FIG. 2) is allowed to deploy when the deployable backbone structure launch hold downs (204) are released and subsequently allow the independent deployment motion/extension of the deployable backbone structure (103) away from the spacecraft (101) to occur. The first deployment stage is completed when the backbone structure (103) is fully extended and latched out (as shown in FIG. 3) to develop its full stiffness and strength capability.

In the second deployment stage of the very high power solar array system (102), structural deployment of the ROSA winglets (104) is initiated when the ROSA winglet launch hold downs (306) are released and the deployment of one or more of the ROSA winglets (104) is motivated by the elastic strain energy of the one or more elastic roll out booms (301). One or more methods of deployment control are provided to ensure a straight and known unrolling deployment path of the one or more elastic roll out booms (301). The flexible photovoltaic blankets (305) can be deployed (unfurled) either simultaneously with the elastic roll out booms (301) as they deploy, or unfurl in a separate, secondary operation that is actuated by a motor after the elastic roll out booms (301) and ROSA structure are fully deployed.

Figure 4:
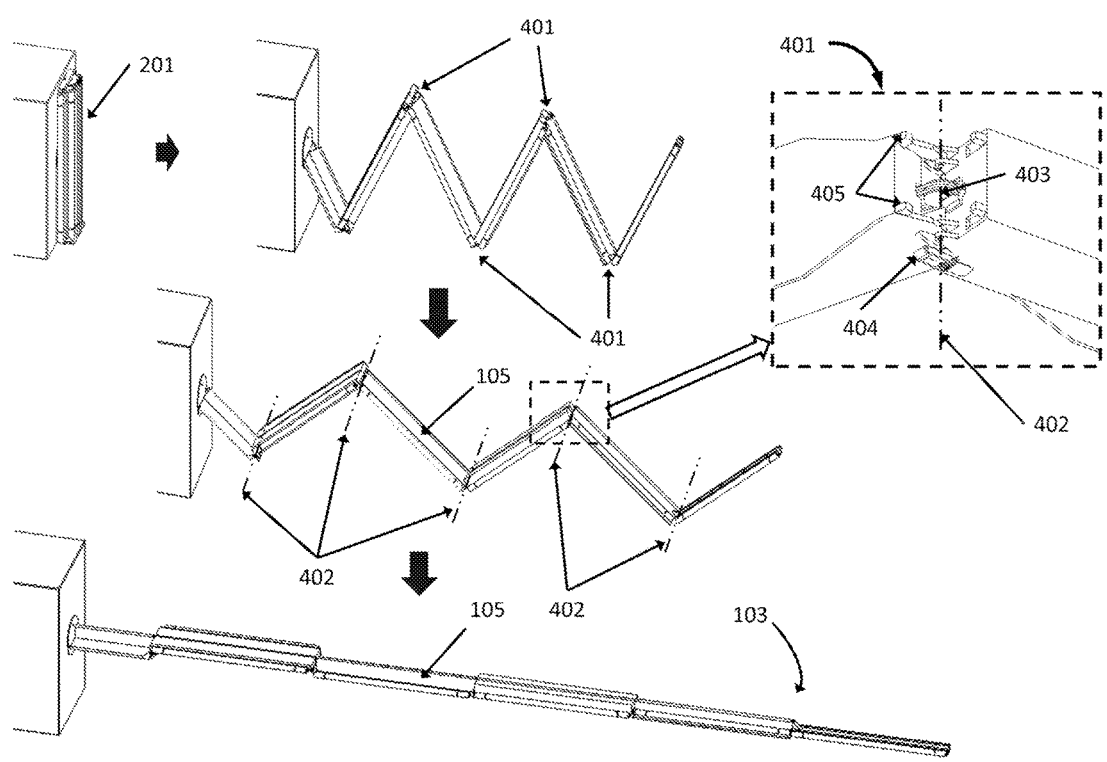
FIG. 4: is a perspective view of one preferred embodiment of the very high power deployable solar array (102) structural system that utilizes a rigid-beam articulating backbone structure design; and showing the backbone structure (first) stage of deployment; whereby the deployable backbone structure (104) portion of the structure is comprised of two or more rigid backbone beam segments (105) that are connected together at their ends with articulated backbone hinges (401) that allow the rigid beam segments ends to rotate relative to one another about the hinge line axis (402) to allow for folding for stowed packaging and subsequent articulating deployment in a z-accordion fashion.

One preferred embodiment of the very high power deployable solar array structural system (shown in FIGS. 4, 5, 6 and 7) utilizes a rigid-beam articulating backbone structure design; whereby the deployable backbone structure (104) portion of the structure is comprised of two or more rigid backbone beam segments (105) that are connected together at their ends with articulated backbone hinges (401) that allow the rigid beam segments ends to rotate relative to one another about the hinge line axis (402) to allow for folding for stowed packaging in a Z-accordion fashion, as shown in FIG. 4. One or more pairs of modular ROSA winglets (104) are attached to one or more of the backbone beam segments (105) along its length in opposing pairs at their base support structures (304); and oriented so the ROSA winglets {104) deploy their elastic roll out booms (301) and flexible photovoltaic blankets (305) linearly in opposite directions from one another.

As shown in FIG. 4, the first stage of deployment of this embodiment is comprised of the following actions: Upon release of the backbone structure launch hold-downs (204), the backbone structure is allowed to articulate from the stowed to deployed (extended) position in a Z-unfolding manner. Actuation force for the unfolding deployment of the interconnected backbone elements (105) can be provided by motors or springs located at the base of the deployable backbone structure (104), in the region where it attaches to the spacecraft (101), or distributed at each hinge line (402). Various methods for synchronization of the interconnected backbone structure beam segments can be utilized to maintain a known and straight kinematic motion of the structure, at a known rate during deployment; including rate-controlling dampers at each hinge line (402) or a cable-pulley system; with the synchronization pulleys (403) located at each backbone hinge line (402), and that are interconnected with fixed cables that run longitudinally along each backbone beam segment; and are actuated by a motor or spring assembly located at the base of the deployable backbone structure (104), in the region where it attaches to the spacecraft (101). Alternatively, one or more torsion spring assemblies or electric motors can be located at each hinge line (402) to actuate hinge rotation and deployment.

Articulated backbone latch assemblies (404) are located at each backbone hinge line (402) to allow the backbone beam segments (105) to interconnect and lock rigidly together in a preloaded fashion when the Z-unfolded backbone structure is fully extended to develop maximum full-deployment stiffness and strength from the deployed articulating backbone structure (104). These latch assemblies may consist of one or more spring-loaded rotating wedges or spring loaded tapered pins that oppose the hinge line axis (402), and engage a mating surface or hole initially when one or more interconnected beam segment hinges (401) is close to fully extended; and continue to engage the mating surface or hole further and tighten as the hinges (401) continue to reach full geometric extension as defined by one or more hinge hard-stops (405).

Figure 5:
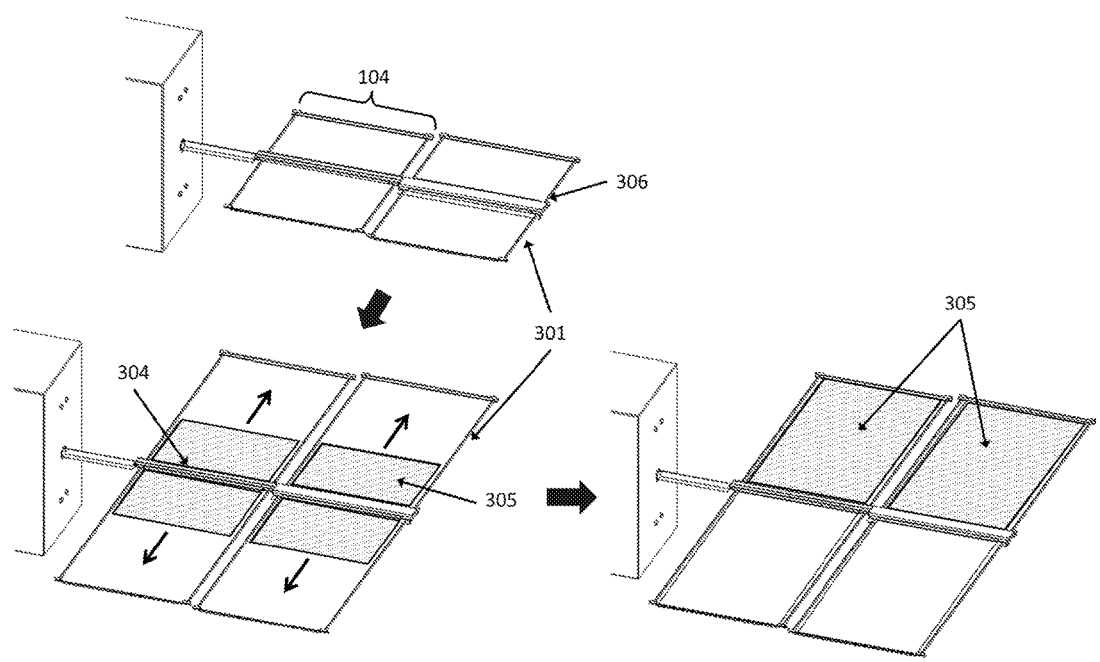
FIG. 5: is a perspective view of a very high power solar array wing (102) in the second stage of the deployment of the Z-accordion backbone embodiment; wherein after release of each ROSA winglet (104) launch tie launch hold downs (306), one or more of the ROSA winglets (104) structure is allowed to deploy by the elastic strain energy of the one or more elastic roll out booms (301); and one or more methods of deployment control are provided to ensure a straight and known unrolling deployment path of the one or more elastic roll out booms (301) away from and normal to the backbone structure (104); and the flexible photovoltaic blankets (305) can be deployed (unfurled) either simultaneously with the elastic roll out booms, or unfurled in a separate, secondary operation that is actuated by a motor located at the base support structure (304); after the roll out ROSA structure is fully deployed.

In the second stage of the deployment of this embodiment, shown in FIG. 5; after release of each ROSA winglet (104) launch tie launch hold downs (306), one or more of the ROSA winglets (104) structure is allowed to deploy by the elastic strain energy of the one or more elastic roll out booms (301); and one or more methods of deployment control are provided to ensure a straight and known unrolling deployment path of the one or more elastic roll out booms (301) away from and normal to the backbone structure (104); and the flexible photovoltaic blankets (305) can be deployed (unfurled) either simultaneously with the elastic roll out booms, or unfurled in a separate, secondary operation that is actuated by a motor located at the base support structure (304); after the roll out ROSA structure is fully deployed. The flexible photovoltaic blankets (305) may be packaged in a rolled or Z-folded configuration and remain uncoupled to the elastic roll out booms (301) along their longitudinal edges.

Figure 6:
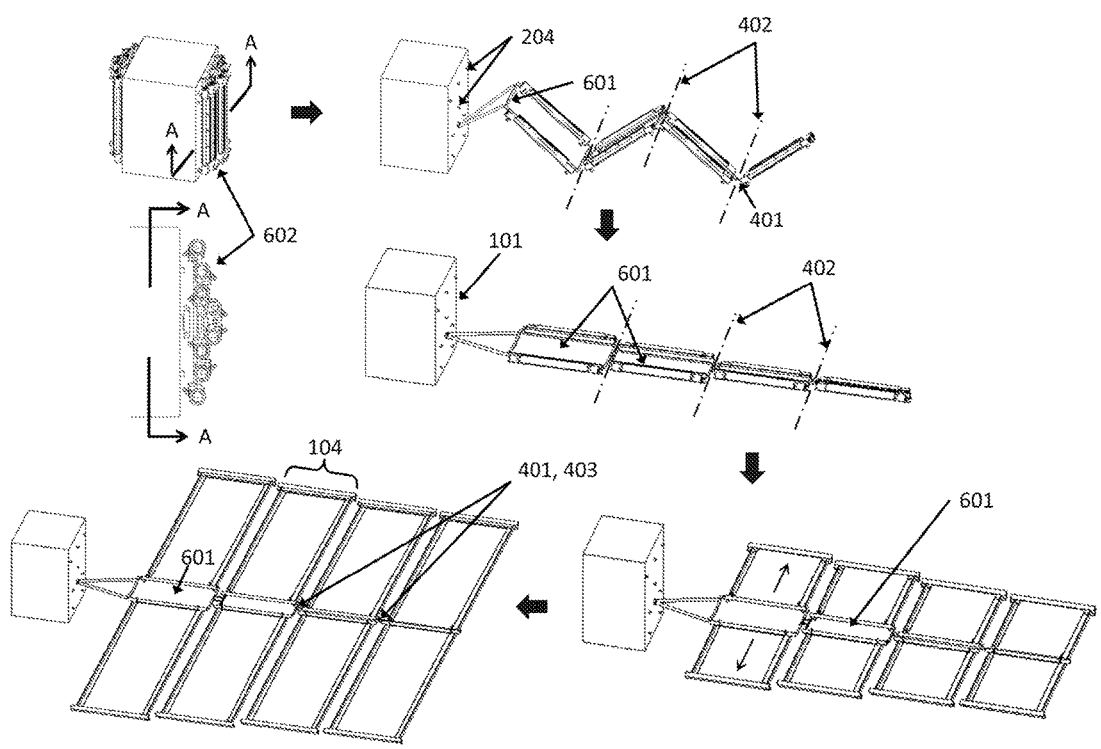
FIG. 6: is a perspective view of one embodiment of the rigid-beam articulating backbone structure design shown during various sequential stages of deployment; wherein the two or more articulating Z-unfolding deployable backbone structure beam segments (105) are comprised of flat solid panel or picture-frame construction (601); and they are configured to stack on top of each other when in the fully stowed configuration (602); and are linked together at their lateral ends via beam segment hinge lines (402) that allow the flat panel or picture frame backbone beam segments (105) to articulate during deployment and then interconnect and lock rigidly together in a preloaded fashion when the Z-unfolded flat panel or picture-frame backbone structure is fully extended.

In one embodiment of the rigid-beam articulating backbone structure design shown in FIG. 6; the two or more articulating Z-unfolding deployable backbone structure beam segments (105) are comprised of flat solid panel or picture-frame construction (601) and they are configured to stack on top of each other when in the fully stowed configuration (602). The individual flat panel or picture frame backbone structural elements (601) are linked together at their lateral ends via beam segment hinge lines (402), comprised of one or more articulated backbone hinges (401) and one or more articulated backbone latch assemblies (403); that allow the flat panel backbone beam segments (105) to articulate during deployment and then interconnect and lock rigidly together in a preloaded fashion when the Z-unfolded flat panel or picture-frame backbone structure is fully extended.

The individual flat panel or frame backbone structure elements (601) are configured to be progressively narrower as their location within the articulated deployable backbone structure (103) approaches the deployed array tip and conversely wider as their longitudinal position approaches the deployed solar array base (closest to the spacecraft, 101) to maximize deployed stiffness efficiency; and to allow the flat panel or frame backbone structural elements to stack when stowed in a preferred geometry, with widest panel/frame closest to the spacecraft and narrowest outboard, to allow a stowed profile shape that allows most efficient packaging into the stowed volume within the launch vehicle shroud (203) available for the stowed very high power solar array (201).

One or more pairs of modular ROSA winglets (104) are attached to one or more of the flat panel or picture frame backbone beam segments (105) along the segment longitudinal sides in opposing pairs at their base support structures (304); and oriented so the ROSA winglets (104) deploy their elastic roll out booms (301) and flexible photovoltaic blankets (305) linearly in opposite directions from one another.

Figure 7:
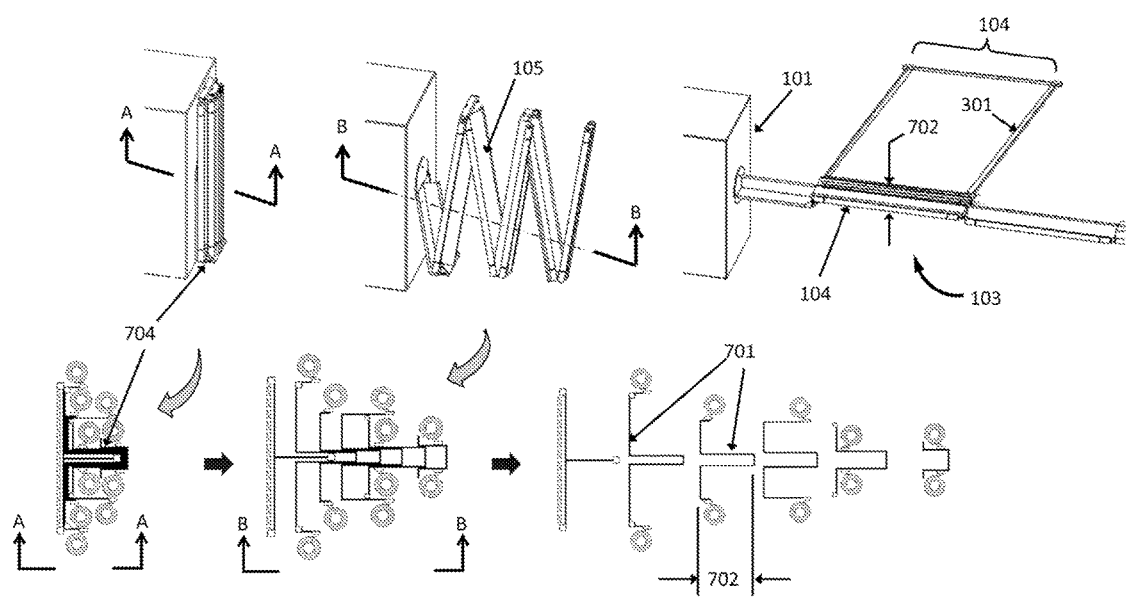
FIG. 7: is a perspective view of another embodiment of the rigid-beam articulating backbone structure design utilizing a nested deep-section beam backbone structure, shown during various stages of deployment. In this nested, deep-section beam backbone structure embodiment of the rigid-beam articulating backbone structure design; the two or more articulating Z-unfolding deployable backbone structure beam segments (105) are comprised of an angular "U" or "V" shaped open cross section construction (701) that allows for significant depth of the beam section about the primary bending axis of the backbone structure when deployed (702), thus improving its deployed stiffness and strength properties; and whose open section construction and shape (701) allows them to nest laterally within one another when stacked together in the stowed configuration (704) to increase stowed packaging efficiency for launch.

In another embodiment of the rigid-beam articulating backbone structure design shown in FIG. 7; the two or more articulating Z-unfolding deployable backbone structure beam segments (105) are comprised of an angular "U" or "V" shaped open cross section construction (701) that allows for significant depth of the beam section about the primary bending axis of the backbone structure when deployed (702), thus improving its deployed stiffness and strength properties. The open cross-section construction may be achieved by the interconnected assembly of multiple smaller flat rigid panels.

The deployable backbone structure beam elements (105) open section construction and shape (701) allows them to nest laterally within one another when stacked together in the stowed configuration (704); and the individual backbone structure beam elements are configured to be progressively narrower as their location within the articulated deployable backbone structure (103) approaches the deployed array tip and conversely wider as their longitudinal position approaches the deployed solar array base (closest to the spacecraft, 101) to maximize deployed stiffness efficiency; and to facilitate nesting Z-unfolding during deployment (703); and to allow the backbone structure beam elements to be stacked when stowed (704) in a preferred geometry with largest open section beam closest to the spacecraft and progressively smaller open section beam outboard to allow the most efficient nested packaging into the stowed volume within the launch vehicle shroud (203) available for the stowed very high power solar array (201).

One or more pairs of modular ROSA winglets (104) are attached to one or more of the angular deep open-section backbone beam segments (105) along the deep-section segment longitudinal sides in opposing pairs at their base support structures (304); and oriented so the ROSA winglets (104) deploy their elastic roll out booms (301) and flexible photovoltaic blankets (305) linearly in opposite directions from one another.

Figure 8:
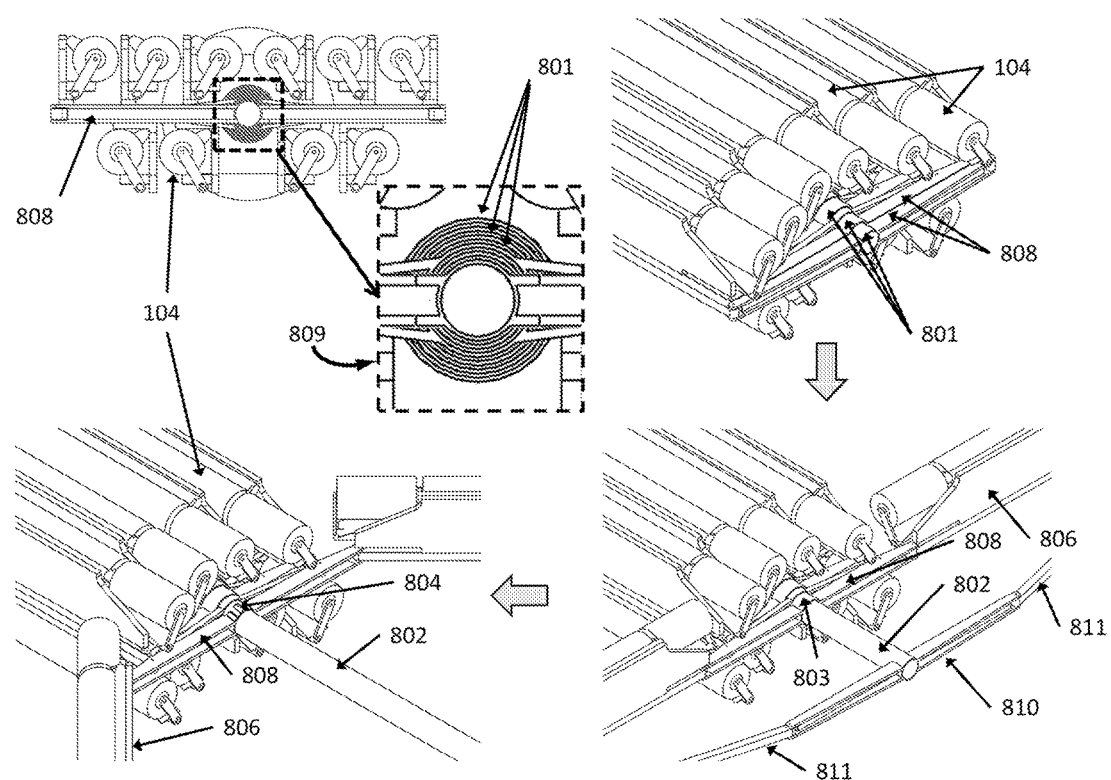
FIG. 8: shows perspective detailed views in the stowed and partial-deployed configuration of another preferred embodiment of the very high power deployable solar array structural system that utilizes a nested tubular-telescopic deployable backbone structure design; whereby the deployable backbone structure (104) portion of the very high power solar array is comprised of two or more telescoping deployable backbone structure tubular beam elements (801); that are progressively smaller in cross-section size to allow them to nest radially within one another when stowed (809); to maximize fully-deployed stiffness efficiency; and to facilitate telescopic extension during deployment.

Another preferred embodiment of the very high power deployable solar array structural system (shown in FIGS. 8, 9, 10 and 11) utilizes a nested tubular-telescopic deployable backbone structure design; whereby the deployable backbone structure (104) portion of the very high power solar array is comprised of two or more telescoping deployable backbone structure tubular beam elements (801) that are each comprised of a closed section; and the closed section deployable backbone structure tubular beam elements (801) are progressively smaller in cross-section size to allow them to nest radially within one another when stowed (809), as shown in FIG. 8. The individual backbone structure closed section tubular beam elements (801) are configured to be progressively smaller in cross-section size as their location within the articulated deployable backbone structure (103) approaches the deployed array tip and conversely larger in cross-section size as their longitudinal position approaches the deployed solar array base (closest to the spacecraft, 101) to maximize fully-deployed stiffness efficiency; and to facilitate radial nesting within the next adjacent tube when stowed and to facilitate telescopic extension during deployment.

Figure 9:
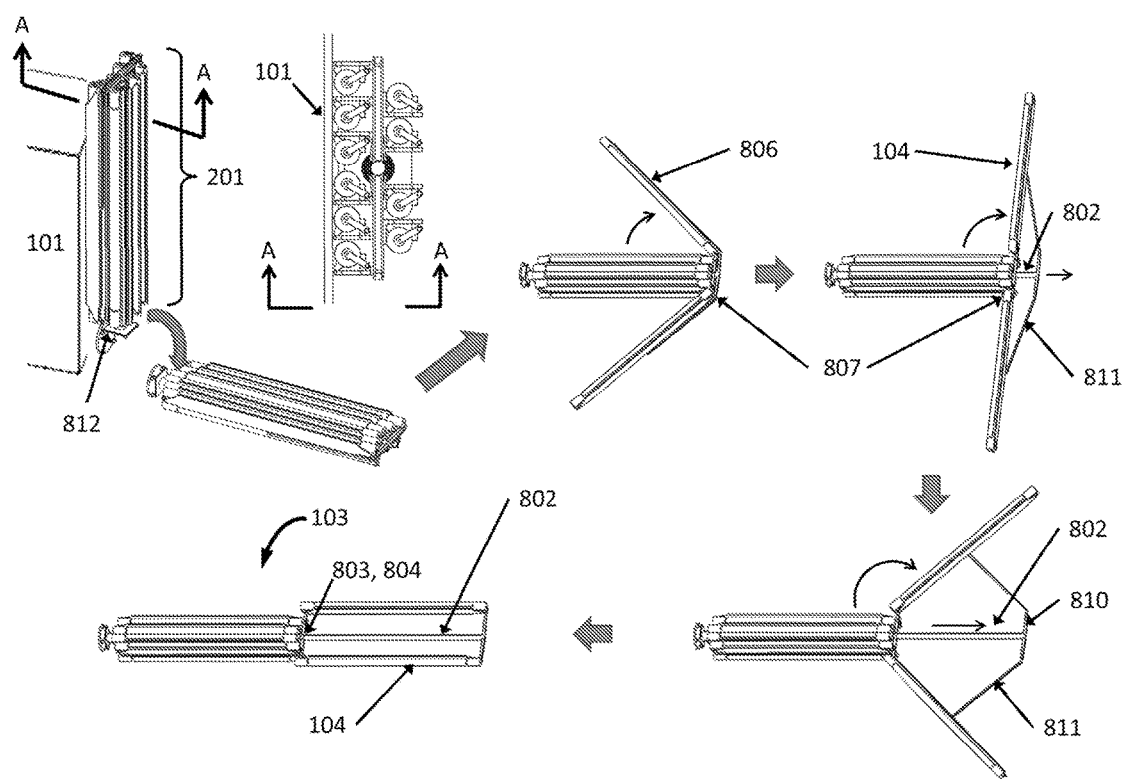
FIG. 9: is a perspective view of the nested tubular-telescopic deployable backbone structure design in various initial stages of backbone deployment; wherein the outermost-when-deployed (smallest diameter or size) closed section tubular beam element (802) is extended first and upon full extension its adjoining end is latched to the next sequential closed section tubular beam element (803) tip with tubular backbone element latch assemblies (804), allowing the backbone tubular segments (801) to interconnect and lock rigidly together sequentially as each closed section tubular beam element (801) is fully extended to develop maximum full-deployment stiffness and strength from the deployed tubular-telescopic backbone structure (104). Also shown are the two or more articulating winglet support struts (805) to which one or more pairs of modular ROSA winglets (104) are along their longitudinal sides; and oriented so the ROSA winglets (104) deploy their elastic roll out booms (301) and flexible photovoltaic blankets (305) linearly in opposing directions from one another.

Each backbone structure closed section tubular beam element (801) may be sequentially driven out using a motor-driven internal lead-screw actuator that interfaces with radially-oriented rollers attached to in inside diameter of each tube; or other equivalent means that provides high deployment axial push force margins for the tubular beam extension. As shown in FIGS. 8 and 9; the outermost-when-deployed (smallest diameter or size) closed section tubular beam element (802) is extended first and upon full extension of its longitudinal length from the nested tube stack, its adjoining end can be latched to the next sequential closed section tubular beam element (803) tip with tubular backbone element latch assemblies (804) that are located at each backbone tube element (801) end. The latching allows the backbone tubular segments (801) to interconnect and lock rigidly together sequentially as each closed section tubular beam element (801) is fully extended; at a location at the adjacent tube full-extended interface, in a preloaded fashion to develop maximum full-deployment stiffness and strength from the deployed tubular-telescopic backbone structure (104).

The telescopic tubular deployable backbone structure (104) is additionally comprised of two or more articulating winglet support struts (805); that are configured in pairs; and (excluding the outermost tip articulating winglet support struts, 806) are connected together at a first end with winglet support strut hinge assemblies (807) that allow rotation of the articulating winglet support struts (805); and at their second end are attached to the telescoping deployable backbone structure tubular beam elements (801) via hinged lateral support braces (808) that laterally span between the outermost extending end of each telescoping tubular backbone structure element (801) and each articulating winglet support strut (805) second end. The outermost tip articulating winglet support struts (806) are attached to the outermost tip backbone structure tubular element (802) via a tip lateral support brace (810) and a hinged tip articulation link (811) that interfaces at a longitudinal location near the mid-span of the outermost tip articulating winglet support struts (806).

One or more pairs of modular ROSA winglets (104) are attached to one or more pairs of the articulating winglet support struts (805) along their longitudinal sides in opposing pairs and attached at the winglet base support structures (304); and oriented so the ROSA winglets (104) deploy their elastic roll out booms (301) and flexible photovoltaic blankets (305) linearly in opposing directions from one another.

As shown in FIG. 9, when stowed, the nested telescopic tube backbone structure is oriented so that the longitudinal direction of the stowed very high power solar array (201) is parallel with the spacecraft (101) wall. Deployment of the nested tubular-telescopic embodiment of the very high power solar array is initiated when the deployable backbone structure launch hold downs (204) are released and the entire stowed very high power solar array (201) is allowed to articulate 90 degrees about its base attachment hinge (812) joint to the spacecraft (101), so upon completion of the rotation it is normal to the spacecraft (101) sidewall to which it was mounted when stowed for launch, after which it is positioned for the first phase of deployment, which is the extension of the telescopic tubular deployable backbone structure (104).

As shown in FIG. 9, deployment of the telescopic tubular deployable backbone structure (104) commences with the axial extension of the outermost tip backbone structure tubular element (809) that is driven out by the motor-driven lead screw actuator or other means. As the tip backbone structure tubular element (802) extends, it pulls the outermost tip articulating winglet support struts (806) and their attached stowed ROSA winglets (104) up and around via the hinged articulation of the tip lateral support brace (810) and the hinged tip articulation links (811) that interface at a longitudinal location near the mid-span of each outermost tip articulating winglet support strut (806). The outermost tip articulating winglet support struts (806) and their attached stowed ROSA winglets (104) rotate a full 180 degrees during deployment/extension of the tip backbone structure tubular element (802), and upon full deployment they latch out into a position that is parallel to the extended outermost tip backbone structure tubular element (802) longitudinal axis; simultaneously with the full-extension latching of the outermost tip backbone structure tubular element (802) to the adjacent backbone structure tubular element (803).

Figure 10:
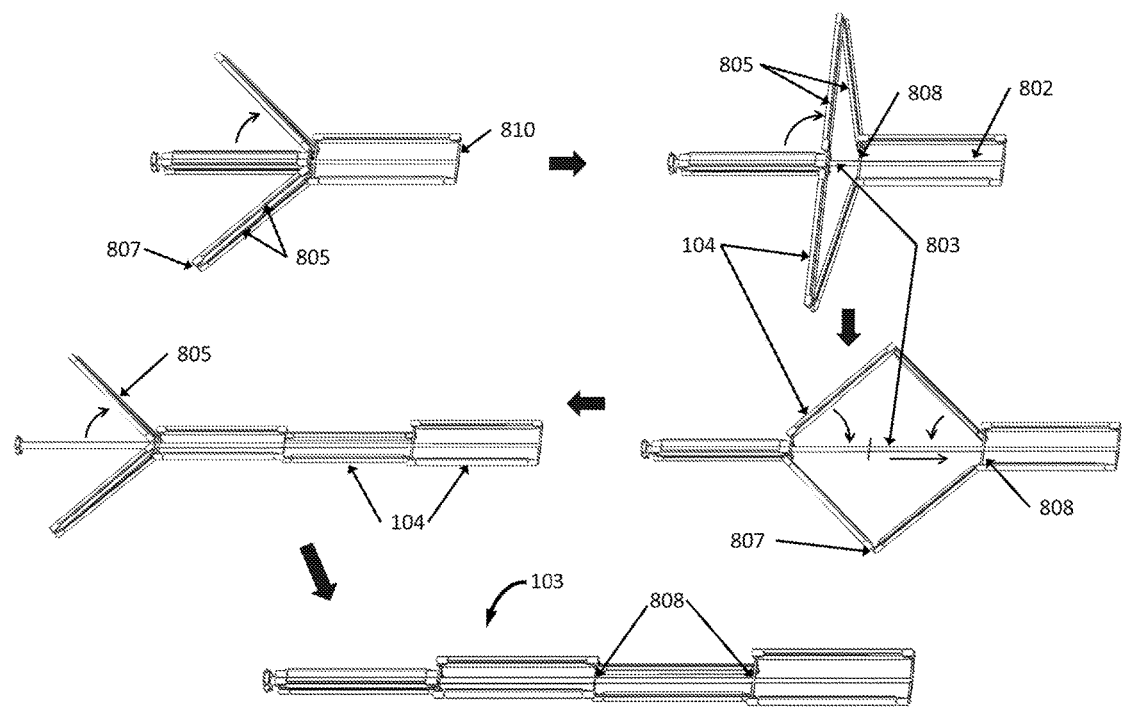
FIG. 10: shows a perspective view of the continuation of the deployment of the telescopic tubular deployable backbone structure (103) that occurs with the sequential motorized extension of the next adjacent nested backbone structure tubular element (801), that pulls the attached two pair of articulating winglet support struts (805) and their attached stowed ROSA winglets (104) up and around in a hinged articulation motion; and by the pulling motion generated by the leading end of the next-sequentially extending telescoping deployable backbone structure tubular beam element (801).

As shown in FIG. 10, continuation of the deployment of the telescopic tubular deployable backbone structure (103) occurs with the sequential motorized extension of the next adjacent nested backbone structure tubular element (801), that pulls the attached two pair of articulating winglet support struts (805) and their attached stowed ROSA winglets (104) up and around in a hinged articulation motion that is allowed by the rotation at the winglet support strut hinge assemblies (807) interconnecting the end of each adjacent winglet support strut pair; and by the pulling motion generated by the leading end of the next-sequentially extending telescoping deployable backbone structure tubular beam element (801) that is connected to the winglet support strut (805) pair end via the hinged lateral support brace (808) that laterally spans between the outermost extending end of the deploying telescoping tubular backbone structure element (801) and each articulating winglet support strut (805) pair outermost deploying end. The articulating winglet support struts (806) and their attached stowed ROSA winglets (104) rotate a full 180 degrees during deployment/extension of the backbone structure tubular element (801), and upon full deployment they latch out into a position that is parallel to the extended backbone structure tubular element (801) longitudinal axis; simultaneously with the full-extension latching of the backbone structure tubular element (801) to the adjacent (next-deploying) backbone structure tubular element.

After full extension and latching of the next adjacent nested backbone structure tubular element, the telescopic tubular backbone structure (103) deployment operation is repeated in a sequential manner for each subsequent nested telescoping backbone structure tubular element (801), and its associated winglet support struts (805), stowed ROSA winglets (104), winglet support strut hinge assemblies (807), hinged lateral support braces (808), until all tubular elements are extended and latched in the full deployed position.

Figure 11:
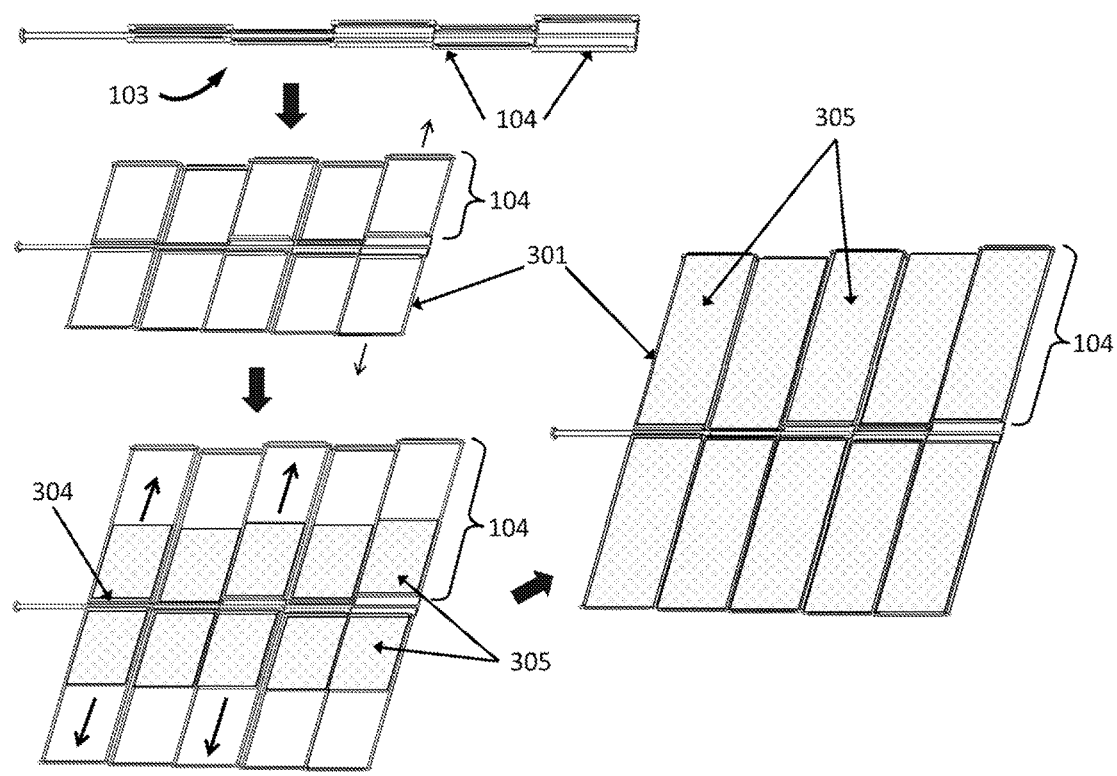
FIG. 11: shows the second stage of the deployment of the telescopic tube backbone embodiment, which is similar to previously described embodiments: after release of each ROSA winglet (104) launch tie launch hold downs (306), one or more of the ROSA winglets (104) structure is allowed to deploy by the elastic strain energy of the one or more elastic roll out booms (301); and one or more methods of deployment control are provided to ensure a straight and known unrolling deployment path of the one or more elastic roll out booms (301) away from and normal to the deployable backbone structure (103); and the flexible photovoltaic blankets (305) can be deployed (unfurled) either simultaneously with the elastic roll out booms, or unfurled in a separate, secondary operation that is actuated by a motor located at the base support structure (304); after the roll out ROSA structure is fully deployed.

The second stage of the deployment of this embodiment, shown in FIG. 11, is similar to previously described embodiments: after release of each ROSA winglet (104) launch tie launch hold downs (306), one or more of the ROSA winglets (104) structure is allowed to deploy by the elastic strain energy of the one or more elastic roll out booms (301); and one or more methods of deployment control are provided to ensure a straight and known unrolling deployment path of the one or more elastic roll out booms (301) away from and normal to the deployable backbone structure (103); and the flexible photovoltaic blankets (305) can be deployed (unfurled) either simultaneously with the elastic roll out booms, or unfurled in a separate, secondary operation that is actuated by a motor located at the base support structure (304); after the roll out ROSA structure is fully deployed. The flexible photovoltaic blankets (305) may be packaged in a rolled or Z-folded configuration and remain uncoupled to the elastic roll out booms (301) along their longitudinal edges.

Figure 12:
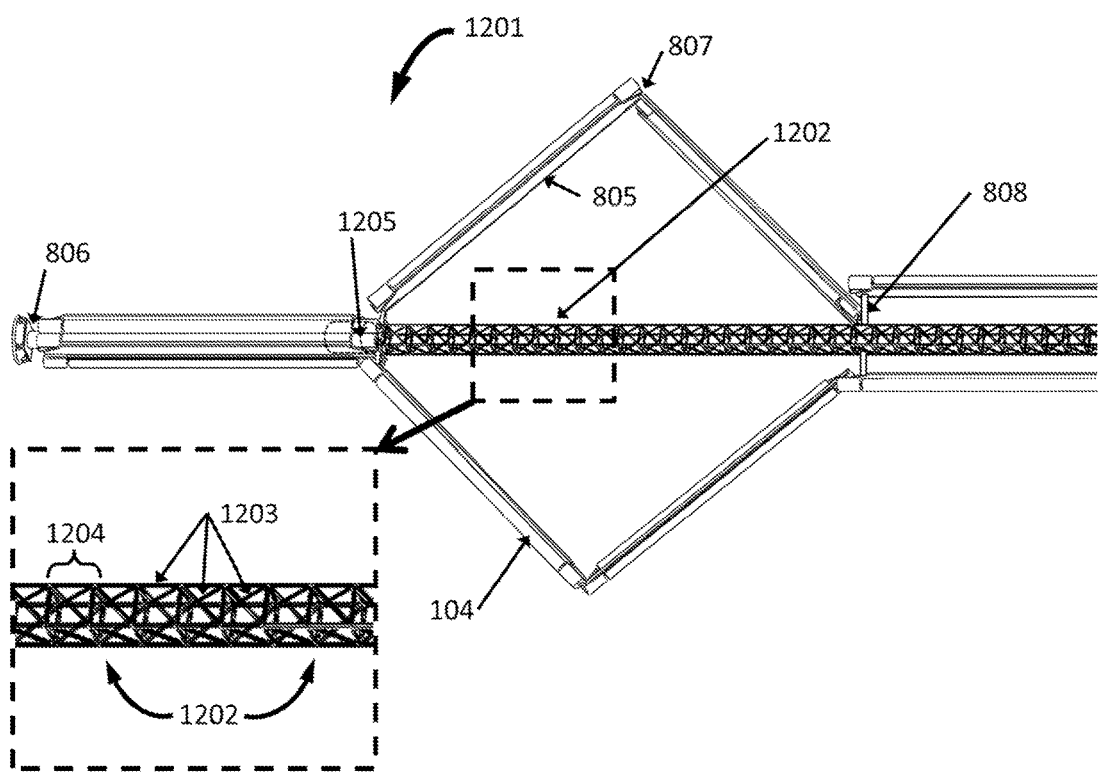
FIG. 12: is a perspective view of another embodiment of the deployable very high power solar array structural system that is similar in kinematic deployment function as the previously described nested tubular-telescopic deployable backbone structure design; however the nested telescopic tubular backbone structure is replaced with an extendible lattice mast deployable backbone structure (1201), consisting of a central deployable lattice truss mast (1202) as the primary axially-extensible actuating element. The deployable lattice truss mast may be of the articulating/latching or continuous-coilable longeron type; and typically consists of individual folding or coiled truss bay elements (1203) that allow the backbone mast structure to package compactly when stowed; and form rigid truss bays (1204) that are deployed in a linear-extruding manner from a cylindrical containment canister (1205).

Another embodiment of the deployable very high power solar array structural system (shown in FIG. 12) is similar in kinematic deployment function as the previously described nested tubular-telescopic deployable backbone structure design; however the nested telescopic tubular structural elements are replaced with an extendible lattice mast deployable backbone structure (1201), consisting of a central deployable lattice truss mast (1202). The deployable lattice truss mast may be of the articulating/latching or continuous-coilable longeron type; and typically consist of individual folding or coiled truss bay elements (1203) that allow the backbone mast structure to package compactly when stowed; and form rigid truss bays (1204) that are deployed in a linear-extruding manner from a cylindrical containment canister (1205). The mast unfolding/uncoiling extrusion is actuated using a motorized gear-driven rotating nut or equivalent actuator that provides high deployment axial push force margins for the lattice truss mast or boom deployable structure (1202) extension.

The extendible lattice mast deployable backbone structure (1201) is additionally comprised of two or more articulating winglet support struts (805); that are configured in pairs; and (excluding the outermost tip articulating winglet support struts, 806) are connected together at a first end with winglet support strut hinge assemblies (807) that allow rotation of the articulating winglet support struts (805); and at their second end are attached to the extendible lattice mast deployable backbone structure (1201) longeron elements (1204) via hinged lateral support braces (808) that laterally span between the outermost extendible lattice mast deployable backbone structure longeron elements (1104) and each articulating winglet support strut (805) second end. The outermost tip articulating winglet support struts (806) are attached to the outermost tip extendible lattice mast deployable backbone structure longeron elements (1204) via a tip lateral support brace (810) that is picked up by and latched to the longeron elements as it extrudes out; and a hinged tip articulation link (811) that interfaces at a longitudinal location near the mid-span of the outermost tip articulating winglet support struts (806).

One or more pairs of modular ROSA winglets (104) are attached to one or more pairs of the articulating winglet support struts (805) along their longitudinal sides in opposing pairs and attached at the winglet base support structures (304); and oriented so the ROSA winglets (104) deploy their elastic roll out booms (301) and flexible photovoltaic blankets (305) linearly in opposing directions from one another.

When stowed, the retracted (coiled or folded) lattice mast structure (1202) within its containment canister (1205), and associated stowed ROSA winglets (104), is oriented so that the longitudinal direction of the stowed very high power solar array (201) is parallel with the spacecraft (101) wall. Deployment of the extendible lattice mast backbone embodiment of the very high power solar array is initiated when the deployable backbone structure launch hold downs (204) are released and the entire stowed very high power solar array (201) is allowed to articulate 90 degrees about its base attachment hinge (806) joint to the spacecraft (101), so that upon completion of the rotation it is normal to the spacecraft (101) sidewall to which it was mounted when stowed for launch, after which it is positioned for the first phase of deployment, which is the extrusion of the extendible lattice mast backbone structure (1201).

The invention claimed is:

1. A deployable backbone structure for support of one or more pairs of roll-out solar array winglets, said deployable backbone structure comprising:
   a. a stowage surface from which said deployable backbone structure is deployed;
   b. a deployment boom, said deployment boom being configured for compact stowage, said deployment boom being operable for extension from said stowage surface, said deployment boom comprising a plurality of linearly-connected telescopic beam elements, wherein each of said telescopic beam elements has a length, a first end, and a second end, and wherein, upon deployment, the first end of one of said telescopic beam elements connects to the second end of another of said telescopic beam elements;
   c. one or more roll-out solar array winglets;
   d. one or more intermediary structures, said intermediary structures being situated between each of said telescopic beam elements, said intermediary structures being operable for sequential extrusion of each of said telescopic beam elements in turn, wherein said intermediary structures are further operable as a deployment platform for deployment of said one or more roll-out solar array winglets; and e. a synchronized telescoping actuation system, said telescoping actuation system being operable for effecting the transition between a stowed configuration wherein said telescopic beam elements are tightly packed such that their lengths are concentric, and a deployed configuration wherein said telescopic beam elements are rigidly connected together and aligned end to end, wherein said telescopic beam elements comprise a set of telescopically nested closed section tubes, said closed section tubes being operable for telescopically nestable arrangement while in the stowed configuration, and rigidly connected together and aligned end to end in the deployed configuration.

2. The deployable backbone structure according to claim 1, further comprising a plurality of latch assemblies configured to rigidly lock a first of said telescopic beam elements to a second of said telescopic beam elements when the first of said telescopic beam elements and the second of said telescopic beam elements are aligned end to end.

3. The deployable backbone structure according to claim 1, further comprising a plurality of articulating winglet support struts fixedly attached to said deployable backbone structure, wherein each of said roll-out solar array winglets is attached to an articulating winglet support strut.

* * * * *